US010363575B2

(12) United States Patent
Mori et al.

(10) Patent No.: US 10,363,575 B2
(45) Date of Patent: Jul. 30, 2019

(54) VIBRATION MOTOR WITH BASE PORTION INCLUDING FIRST AND SECOND PLATE PORTIONS

(71) Applicant: Nidec Seimitsu Corporation, Ueda-shi, Nagano-ken (JP)

(72) Inventors: Zendi Mori, Ueda (JP); Mitsuru Murata, Ueda (JP)

(73) Assignee: NIDEC SEIMITSU CORPORATION, Nagano (JP)

( * ) Notice: Subject to any disclaimer, the term of this patent is extended or adjusted under 35 U.S.C. 154(b) by 247 days.

(21) Appl. No.: 15/421,658

(22) Filed: Feb. 1, 2017

(65) Prior Publication Data
US 2017/0246665 A1 Aug. 31, 2017

(30) Foreign Application Priority Data

Feb. 26, 2016 (JP) ................. 2016-035599

(51) Int. Cl.
*H02K 11/30* (2016.01)
*B06B 1/16* (2006.01)
(Continued)

(52) U.S. Cl.
CPC ............... *B06B 1/16* (2013.01); *H02K 3/28* (2013.01); *H02K 5/04* (2013.01); *H02K 5/225* (2013.01);
(Continued)

(58) Field of Classification Search
CPC ...... B06B 1/16; H02K 11/30; H02K 11/0094; H02K 3/28; H02K 5/04; H02K 5/225;
(Continued)

(56) References Cited

U.S. PATENT DOCUMENTS

| 2007/0024134 A1* | 2/2007 | Huang | ............... H02K 7/063 |
| | | | 310/81 |
| 2009/0309436 A1* | 12/2009 | Saito | ............... H02K 3/46 |
| | | | 310/81 |

(Continued)

FOREIGN PATENT DOCUMENTS

JP 2009-130969 A 6/2009

OTHER PUBLICATIONS

Mori et al., "Vibration Motor,", U.S. Appl. No. 15/421,656, filed Feb. 1, 2017.

*Primary Examiner* — Michael Andrews
(74) *Attorney, Agent, or Firm* — Keating & Bennett, LLP

(57) ABSTRACT

A base portion of a vibration motor includes a first plate including a first plate recessed portion in an upper surface thereof; and a second plate arranged in the first plate recessed portion, and fixed to the first plate. One of the first and second plates is made of a magnetic metal, while another one is made of a nonmagnetic metal. An upper surface of the second plate is arranged at the same level as that of a portion of the upper surface of the first plate which lies adjacent to and along the first plate recessed portion. The second plate includes an annular second plate support portion centered on a central axis; and a plurality of second plate projecting portions arranged to project radially inward or radially outward from the second plate support portion, and arranged in a circumferential direction at a position vertically opposed to a magnet portion.

11 Claims, 18 Drawing Sheets

(51) Int. Cl.
    *H02K 3/28*     (2006.01)
    *H02K 5/04*     (2006.01)
    *H02K 5/22*     (2006.01)
    *H02K 7/08*     (2006.01)
    *H02K 11/00*     (2016.01)
    *H02K 7/06*     (2006.01)
    *H02K 7/09*     (2006.01)

(52) U.S. Cl.
    CPC ............... *H02K 7/063* (2013.01); *H02K 7/08* (2013.01); *H02K 7/083* (2013.01); *H02K 11/0094* (2013.01); *H02K 11/30* (2016.01); *H02K 7/09* (2013.01)

(58) Field of Classification Search
    CPC .......... H02K 7/063; H02K 7/08; H02K 7/083; H02K 7/09
    USPC ................................................ 310/81, 156.32
    See application file for complete search history.

(56) References Cited

U.S. PATENT DOCUMENTS

| | | | | |
|---|---|---|---|---|
| 2011/0001385 A1* | 1/2011 | Saito | ...................... | H02K 7/063 310/214 |
| 2013/0320790 A1* | 12/2013 | Aoi | ........................ | H02K 7/063 310/81 |
| 2015/0236563 A1* | 8/2015 | Yamaguchi | ............ | H02K 7/063 310/81 |
| 2015/0327356 A1* | 11/2015 | Kjellstrom | ........... | H05K 1/0231 310/68 R |

* cited by examiner

US 10,363,575 B2

VIBRATION MOTOR WITH BASE PORTION INCLUDING FIRST AND SECOND PLATE PORTIONS

CROSS REFERENCE TO RELATED APPLICATIONS

This application claims the benefit of priority to Japanese Patent Application No. 2016-035599 filed on Feb. 26, 2016. The entire contents of this application are hereby incorporated herein by reference.

BACKGROUND OF THE INVENTION

1. Field of the Invention

The present invention relates to a vibration motor.

2. Description of the Related Art

Brushless vibration motors in the shape of a thin coin have often been used as silent notification devices in mobile communication apparatuses or the like, or for other purposes. JP-A 2009-130969 describes such a vibration motor, in which a power supply flexible board 40 is fixed onto a stator magnetic plate 10. Three cogging torque generating round holes h1 to h3, which are arranged in a circumferential direction, are defined in the stator magnetic plate 10. This prevents an annular magnet from stopping at a dead point, which would prohibit a rotating portion from starting rotating.

When the size of a vibration motor is to be reduced, a reduction in the size of a base portion is demanded. However, a reduction in the radial dimension of the stator magnetic plate described in JP-A 2009-130969 leads to an increase in the proportion of the total area of the cogging torque generating round holes h1 to h3 to the area of the stator magnetic plate 10. This results in a reduction in rigidity of the stator magnetic plate 10.

SUMMARY OF THE INVENTION

A vibration motor according to a preferred embodiment of the present invention includes a base portion arranged to extend perpendicularly to a central axis extending in a vertical direction; a cover portion arranged above the base portion, and fixed to an outer edge portion of the base portion; a shaft arranged to extend along the central axis, and having an end portion or portions supported by at least one of the base portion and the cover portion; a rotor holder arranged around the shaft to be rotatable about the central axis; a magnet portion including a plurality of magnetic poles, and attached to the rotor holder; an eccentric weight attached to the rotor holder; a circuit board arranged above the base portion; and a coil portion attached onto the circuit board, and arranged vertically opposite to the magnet portion with a space therebetween. The base portion includes a first plate including a first plate recessed portion in an upper surface thereof; and a second plate arranged in the first plate recessed portion, and fixed to the first plate. One of the first and second plates is made of a magnetic metal, while another one of the first and second plates is made of a nonmagnetic metal. An upper surface of the second plate is arranged at a same level as that of a portion of the upper surface of the first plate which lies adjacent to and along the first plate recessed portion. The second plate includes an annular second plate support portion centered on the central axis; and a plurality of second plate projecting portions arranged to project radially inward or radially outward from the second plate support portion, and arranged in a circumferential direction at a position vertically opposed to the magnet portion.

The above preferred embodiment of the present invention is able to achieve an increase in rigidity of the base portion.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 2:
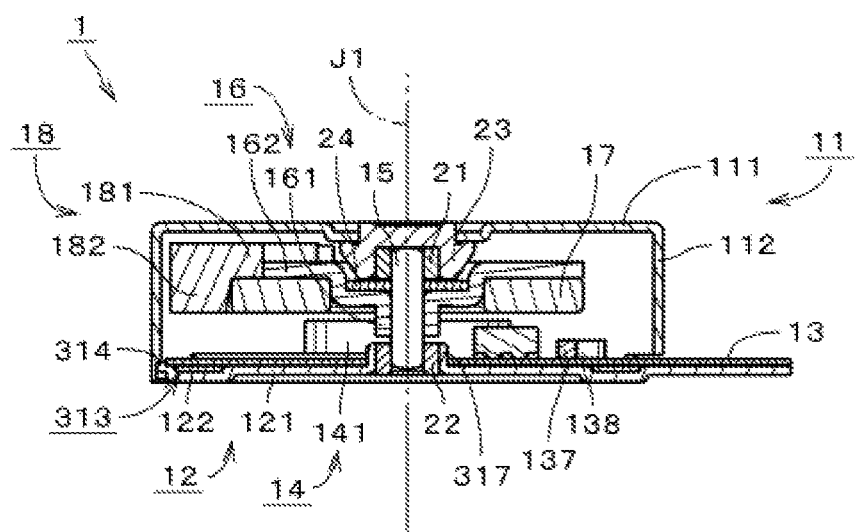
FIG. 2 is a vertical sectional view of the vibration motor.

It is assumed herein that a vertical direction is defined as a direction in which a central axis J1 of a vibration motor 1 extends, and that an upper side and a lower side along the central axis J1 in FIG. 2 are referred to simply as an upper side and a lower side, respectively. It should be noted, however, that the above definitions of the vertical direction and the upper and lower sides are not meant to indicate relative positions or directions of different members or portions when those members or portions are actually installed in a device. It is also assumed herein that a direction parallel to the central axis J1 is referred to as the vertical direction. Further, it is assumed herein that radial directions centered on the central axis J1 are simply referred to by the term "radial direction", "radial", or "radially", and that a circumferential direction about the central axis J1 is simply referred to by the term "circumferential direction", "circumferential", or "circumferentially".

Figure 1:
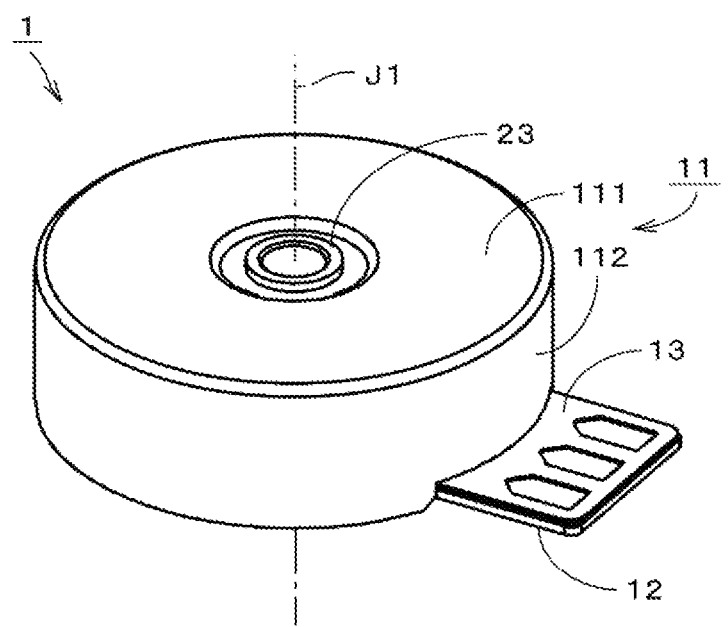
FIG. 1 is a perspective view of a vibration motor according to a preferred embodiment of the present invention.
Figure 3:
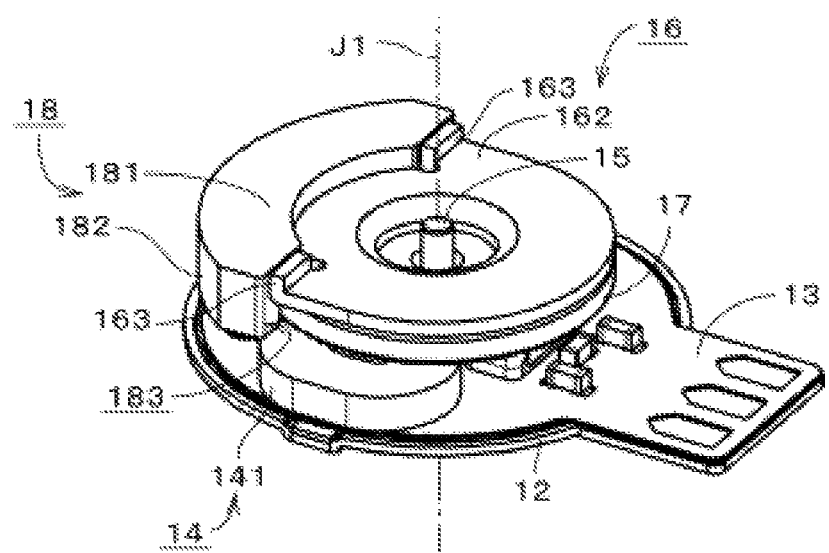
FIG. 3 is a perspective view of a rotating portion and a stationary portion of the vibration motor.
Figure 4:
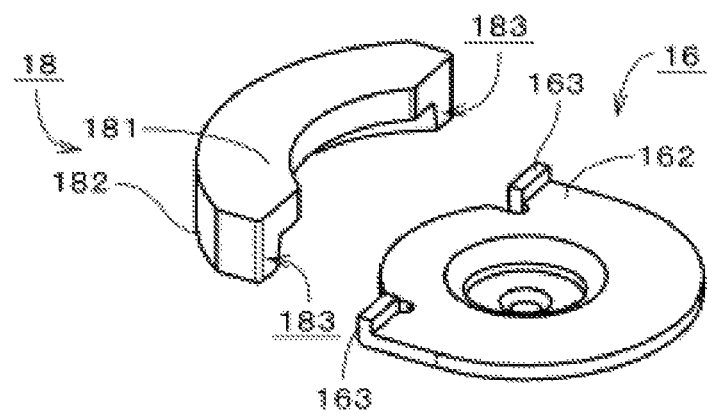
FIG. 4 is an exploded perspective view of a rotor holder and an eccentric weight of the vibration motor.
Figure 5:
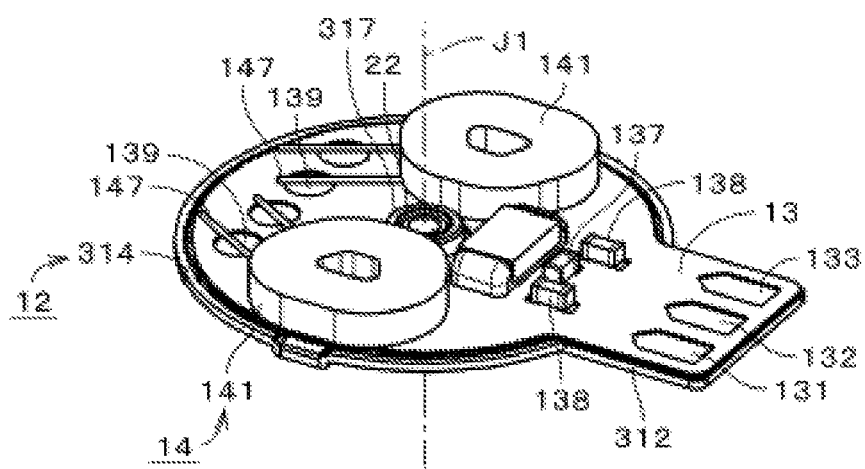
FIG. 5 is a perspective view of the stationary portion.
Figure 6:
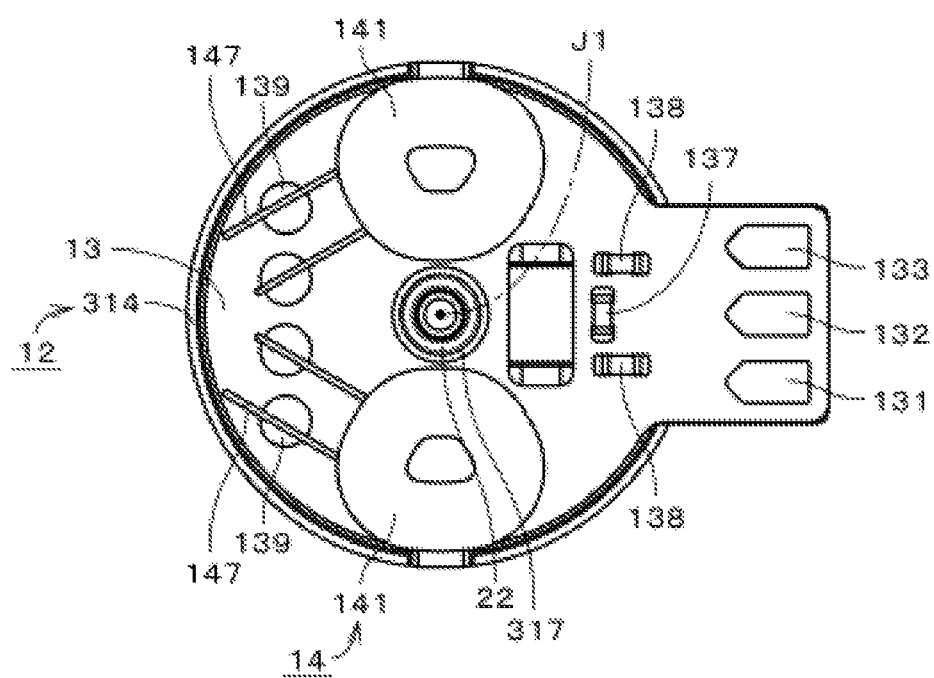
FIG. 6 is a plan view of the stationary portion.
Figure 7:
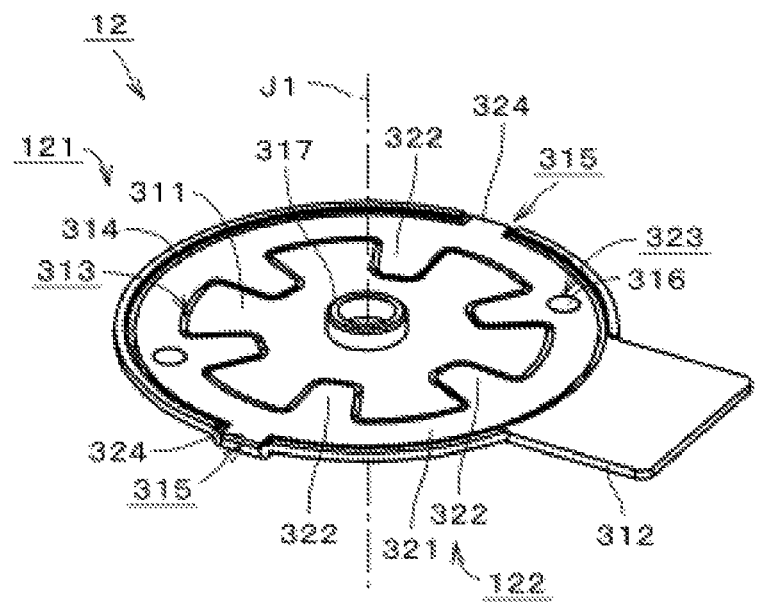
FIG. 7 is a perspective view of a base portion of the vibration motor.
Figure 8:
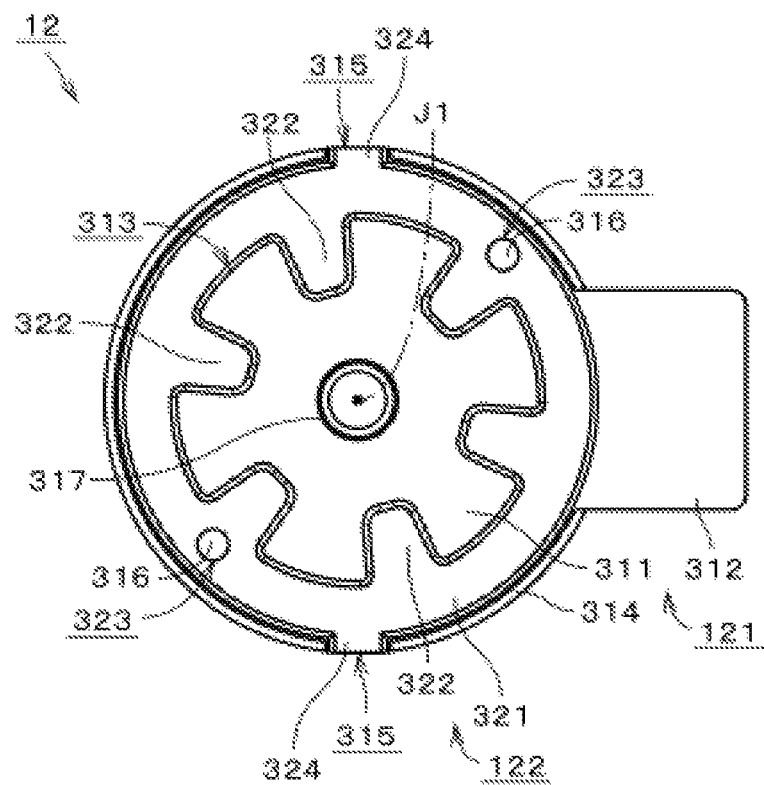
FIG. 8 is a plan view of the base portion.

FIG. 1 is a perspective view illustrating the external appearance of the vibration motor 1 according to a first preferred embodiment of the present invention. FIG. 2 is a vertical sectional view of the vibration motor 1. Parallel oblique lines are omitted for sections of details in FIG. 2. In addition, in FIG. 2, features on the far side of the section of the vibration motor 1 are also depicted. FIG. 3 is a perspective view of a rotating portion and a stationary portion of the vibration motor 1. FIG. 4 is an exploded perspective view of a rotor holder 16 and an eccentric weight 18. FIG. 5 is a perspective view of the stationary portion of the vibration motor 1. FIG. 6 is a plan view of the stationary portion of the vibration motor 1. FIG. 7 is a perspective view of a base portion 12. FIG. 8 is a plan view of the base portion 12.

The vibration motor 1 is a brushless motor in the shape of a coin. The vibration motor 1 is used as, for example, a silent notification device in a mobile communication apparatus, such as a cellular phone. In other words, the vibration motor 1 is included in the mobile communication apparatus, for example.

The vibration motor 1 includes a cover portion 11 and the base portion 12. The cover portion 11 is substantially in the shape of a covered cylinder. The cover portion 11 includes a cover top portion 111 and a cover side wall portion 112. The cover top portion 111 is a top portion substantially in the shape of an annular plate and centered on the central axis J1. The cover side wall portion 112 is a substantially cylindrical side wall portion centered on the central axis J1. The cover side wall portion 112 is arranged to extend downward from an outer edge portion of the cover top portion 111. The base portion 12 is substantially in the shape of a plate. The base portion 12 is arranged to extend substantially perpendicularly to the central axis J1, which extends in the vertical direction.

The cover portion 11 is arranged above the base portion 12. The cover portion 11 is defined by a member separate from the base portion 12. The cover portion 11 is fixed to an outer edge portion of the base portion 12. The base portion 12 is arranged to close a lower opening of the cover portion 11. For example, an inside surface of a lower end portion of the cover portion 11 is arranged to be in contact with an outside surface of the base portion 12. The cover portion 11 is fixed to the base portion 12 through, for example, crimping. Note that the cover portion 11 and the base portion 12 may alternatively be fixed to each other through, for example, welding. Each of the cover portion 11 and the base portion 12 is made of a metal. The cover portion 11 is made of, for example, a magnetic material. The thickness of the base portion 12 is, for example, 0.8 mm or less. Note that the cover portion 11 and the base portion 12 may alternatively be defined by a single continuous monolithic member.

The vibration motor 1 further includes a circuit board 13, a coil portion 14, a shaft 15, the rotor holder 16, a magnet portion 17, the eccentric weight 18, an upper bearing portion 21, a lower bearing portion 22, a bearing housing portion 23, and a spacer 24. Each of the base portion 12, the circuit board 13, the coil portion 14, the upper bearing portion 21, the lower bearing portion 22, and the bearing housing portion 23 is included in the stationary portion. Each of the shaft 15, the rotor holder 16, the magnet portion 17, the eccentric weight 18, and the spacer 24 is included in the rotating portion. That is, the vibration motor 1 is a vibration motor of a rotating-shaft type. All the components of the stationary portion except for the base portion 12 and all the components of the rotating portion are covered with the cover portion 11 on the upper and lateral sides. FIG. 3 is a diagram illustrating the vibration motor 1 with the cover portion 11, the upper bearing portion 21, and the bearing housing portion 23 removed therefrom. Each of FIGS. 5 and 6 is a diagram illustrating the vibration motor 1 with the cover portion 11, the upper bearing portion 21, the bearing housing portion 23, and the rotating portion removed therefrom.

The base portion 12 includes a first plate 121 and a second plate 122. Each of the first and second plates 121 and 122 is substantially in the shape of a plate, and is arranged to extend substantially perpendicularly to the central axis J1. The second plate 122 is arranged on the first plate 121, and is fixed to the first plate 121. One of the first and second plates 121 and 122 is made of a magnetic metal, and the other one of the first and second plates 121 and 122 is made of a nonmagnetic metal. Hereinafter, it is assumed that the first plate 121 is made of a nonmagnetic metal, while the second plate 122 is made of a magnetic metal. The first plate 121 is made of, for example, an austenitic stainless steel. The second plate 122 is made of, for example, iron.

The first plate 121 includes a first plate body 311 and a first plate side portion 312. The first plate body 311 and the first plate side portion 312 are defined by a single continuous monolithic member. The first plate body 311 is a substantially disk-shaped portion centered on the central axis J1. The first plate body 311 is arranged under the cover portion 11. The first plate side portion 312 is a portion substantially in the shape of a rectangular plate in a plan view. The first plate side portion 312 is arranged to extend from the first plate body 311 substantially perpendicularly to the central axis J1 to project radially outward from the cover portion 11. An upper surface of the first plate side portion 312 is arranged at substantially the same level as that of an upper surface of the first plate body 311.

A base central through hole, which passes through the first plate 121 in the vertical direction, is defined in a central portion of the first plate body 311. The base central through hole is substantially in the shape of a circle with the central axis J1 as a center in a plan view. A base projecting portion 317, which is arranged to project upward from a circumference of the base central through hole, is defined in an upper surface of the first plate body 311. The base projecting portion 317 is, for example, a substantially cylindrical portion centered on the central axis J1. An inner circumferential surface of the base projecting portion 317 is a substantially cylindrical surface centered on the central axis J1.

An annular recessed portion 313 (hereinafter referred to as a "first plate recessed portion 313") recessed downward is defined in the upper surface of the first plate body 311. In other words, the first plate 121 includes the first plate recessed portion 313 in an upper surface thereof. The first plate recessed portion 313 is defined by, for example, subjecting a substantially plate-shaped material which is a workpiece from which to manufacture the first plate 121 to press working. Defining the first plate recessed portion 313 by the press working leads to an increase in rigidity of the first plate 121 without an increase in weight of the first plate 121. This in turn leads to an increase in rigidity of the base portion 12 without an increase in weight of the base portion 12. An outer circumferential edge of the first plate recessed portion 313 is arranged in the vicinity of an outer edge portion of the first plate body 311.

A projecting outer edge portion 314, which is arranged to project upward relative to a bottom surface of the first plate recessed portion 313, is defined in the outer edge portion of the first plate body 311. In other words, the first plate 121 includes the projecting outer edge portion 314 arranged to project upward in an outer edge portion thereof. An upper surface of the projecting outer edge portion 314 is arranged at a level higher than that of an upper surface of the second plate 122. The projecting outer edge portion 314 is arranged to extend along an outer edge of the first plate body 311. In the preferred embodiment illustrated in FIGS. 7 and 8, the projecting outer edge portion 314 includes two portions each of which is substantially in the shape of a semicircle, with both circumferential ends of the two portions being circumferentially spaced from one another. In other words, the projecting outer edge portion 314, which is substantially annular and extends along the outer edge of the first plate body 311, includes two cut portions 315 defined therein. The two cut portions 315 are arranged on opposite sides of the central axis J1. Each cut portion 315 is continuous with the first plate recessed portion 313. A bottom surface of the cut portion 315 is arranged at substantially the same level as that of the bottom surface of the first plate recessed portion 313. The cut portion 315 may be regarded as a portion of the first plate recessed portion 313.

The second plate 122 is arranged to have substantially the same shape and size as those of the first plate recessed portion 313. The second plate 122 is arranged in the first plate recessed portion 313, and is fixed to the first plate 121. The second plate 122 may be only substantially in the same shape and size as those of the first plate recessed portion 313. For example, the second plate 122 may be slightly smaller than the first plate recessed portion 313, and a slight gap may be defined between a side surface of the second plate 122 fixed in the first plate recessed portion 313 and a side surface of the first plate recessed portion 313.

The upper surface of the second plate 122 is arranged at substantially the same level as that of a portion of the upper surface of the first plate 121 which lies adjacent to and along the first plate recessed portion 313. Specifically, the upper surface of the second plate 122 is arranged at substantially the same level as that of a portion of the upper surface of the first plate 121 which is radially inward of the first plate recessed portion 313 and radially outward of the base portion projecting portion 317. In addition, the upper surface of the second plate 122 is arranged at substantially the same level as that of the upper surface of the first plate side portion 312.

The second plate 122 includes a second plate support portion 321 and a plurality of second plate projecting portions 322. The second plate support portion 321 is a substantially annular portion centered on the central axis J1. Each of the second plate projecting portions 322 is arranged to project radially inward from the second plate support portion 321. The second plate support portion 321 and the second plate projecting portions 322 are defined by a single continuous monolithic member.

Each of the second plate projecting portions 322 is arranged to have the same shape. The circumferential width of each of the second plate projecting portions 322 is arranged to decrease in the radially inward direction. The second plate projecting portions 322 are arranged at substantially equal angular intervals in the circumferential direction. In the preferred embodiment illustrated in FIGS. 7 and 8, the second plate projecting portions 322 are six in number, and the six second plate projecting portions 322 are arranged at intervals of about 60 degrees. In other words, in a plan view, an angle defined between a straight line that joins a circumferential middle of each second plate projecting portion 322 and the central axis J1, and a straight line that joins a circumferential middle of the second plate projecting portion 322 adjacent thereto and the central axis J1, is about 60 degrees. Note that the number of second plate projecting portions 322 may be modified appropriately.

The second plate projecting portions 322 are arranged at a position vertically opposed to the magnet portion 17, which will be described below. At this position, the second plate projecting portions 322, each of which is made of the magnetic metal, and portions of the first plate 121, which is made of the nonmagnetic metal, are arranged alternately at substantially equal angular intervals in the circumferential direction. The second plate support portion 321 is arranged radially outward of the position vertically opposed to the magnet portion 17.

The second plate support portion 321 includes through holes 323 each of which passes through the second plate 122 in the vertical direction. In other words, the second plate 122 includes the through holes 323, each of which is arranged radially outward of the magnet portion 17. The first plate 121 includes projection portions 316 each of which is arranged to project upward from the bottom surface of the first plate recessed portion 313. Each through hole 323 is, for example, substantially circular in a plan view. Each projection portion 316 is, for example, substantially columnar. Each projection portion 316 of the first plate 121 is fitted in a separate one of the through holes 323 of the second plate 122. In the preferred embodiment illustrated in FIGS. 7 and 8, the number of projection portions 316 and the number of through holes 323 are both two, and the two projection portions 316 and the two through holes 323 are defined in the first and second plates 121 and 122, respectively.

In the base portion 12, for example, each projection portion 316 of the first plate 121 and a portion of the second plate 122 which surrounds the corresponding through hole 323 are welded together to fix the second plate 122 to the first plate 121. In this case, a welding mark is defined at a boundary between each projection portion 316 of the first plate 121 and the corresponding through hole 323 of the second plate 122. Note that the first and second plates 121 and 122 may alternatively be welded together at a position other than the projection portions 316. Also note that the fixing of the second plate 122 to the first plate 121 may not necessarily be achieved by welding. For example, the second plate 122 may alternatively be fixed to the first plate 121 through an adhesive. Note that the concept of the term "adhesive" as used here includes a double-sided tape, glue, and so on. The same holds true in the following description as well.

The second plate 122 further includes extension portions 324. In the preferred embodiment illustrated in FIGS. 7 and 8, the number of extension portions 324 is two, and the two extension portions 324 are arranged at an outer edge portion of the second plate 122. Each extension portion 324 is arranged to project radially outward from an outer edge of the second plate support portion 321. In other words, the extension portion 324 is arranged to project from the second plate support portion 321 in a radial direction to a side opposite to the second plate projecting portions 322. The extension portion 324 is smaller than each second plate projecting portion 322. The extension portion 324 is arranged to have a radial dimension substantially equal to the radial dimension of the projecting outer edge portion 314 of the first plate 121. The extension portion 324 is arranged to have a circumferential dimension substantially equal to the circumferential dimension of each cut portion 315. The two extension portions 324 of the second plate 122 are arranged in the two cut portions 315 of the first plate 121. In other words, a portion of the outer edge portion of the second plate 122 is arranged in each cut portion 315.

Figure 9:
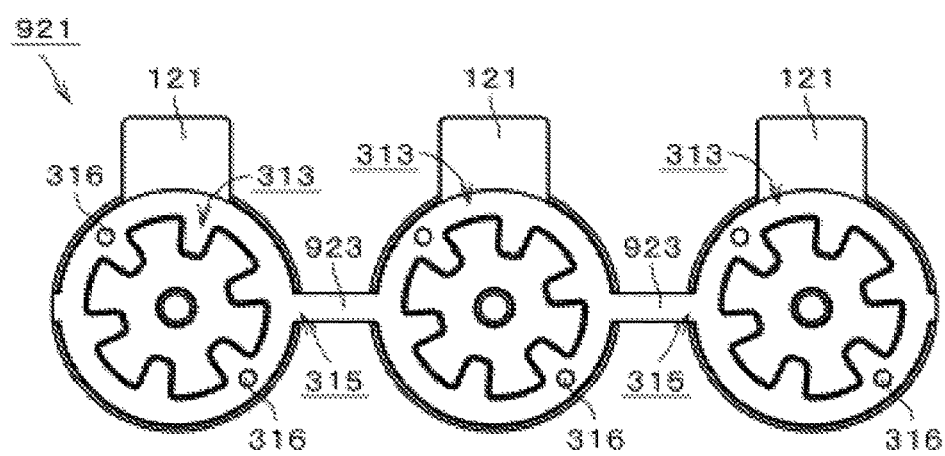
FIG. 9 is a plan view of a first workpiece.
Figure 10:
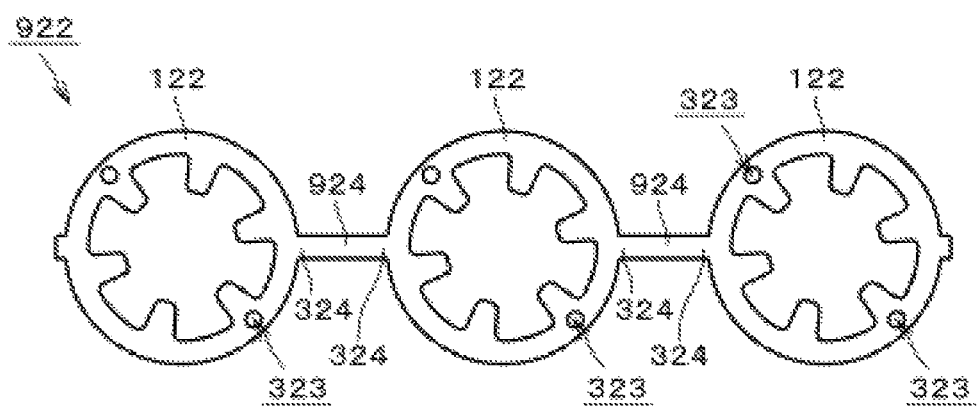
FIG. 10 is a plan view of a second workpiece.

FIGS. 9 and 10 are diagrams for explaining an example method for manufacturing the base portion 12. FIG. 9 is a plan view of a first workpiece 921. The first workpiece 921 is made up of a plurality of first plates 121 joined to one another through a first joining portion 923. In the first workpiece 921, the first plates 121, oriented in the same direction, are arranged in a straight line. Adjacent ones of the first plates 121 are joined to each other through the first joining portion 923, which is in the shape of a strip and extends substantially in a straight line between the cut portions 315 of the adjacent first plates 121. The first joining portion 923 is arranged to have a width substantially equal to the circumferential dimension of each cut portion 315. In the first workpiece 921 according to the example illustrated in FIG. 9, three of the first plates 121 are joined to one another through two of the first joining portions 923. Note that the number of first plates 121 included in the first workpiece 921 may be modified appropriately.

FIG. 10 is a plan view of a second workpiece 922. The second workpiece 922 is made up of a plurality of second plates 122 joined to one another through a second joining portion 924. In the second workpiece 922, the second plates 122, oriented in the same direction, are arranged in a straight line. Adjacent ones of the second plates 122 are joined to each other through the second joining portion 924, which is in the shape of a strip and extends substantially in a straight line between the extension portions 324 of the adjacent second plates 122. The second joining portion 924 is arranged to have a width substantially equal to the circumferential dimension of each extension portion 324. In the second workpiece 922 according to the example illustrated in FIG. 10, three of the second plates 122 are joined to one another through two of the second joining portions 924. Note that the number of second plates 122 included in the second workpiece 922 may be modified appropriately.

When the base portion 12 is manufactured, the second workpiece 922 is first placed upon the first workpiece 921. At this time, each second plate 122 is arranged in the first plate recessed portion 313 of the corresponding first plate 121. The projection portions 316 of each first plate 121 are fitted into the through holes 323 of the corresponding second plate 122. The extension portions 324 of each second plate 122 are arranged in the cut portions 315 of the corresponding first plate 121. The second joining portions 924 are arranged on the first joining portions 923.

Next, each projection portion 316 of each first plate 121 and the portion of the corresponding second plate 122 which surrounds the corresponding through hole 323 are welded together to fix each second plate 122 to the corresponding first plate 121. Then, the first and second joining portions 923 and 924 are cut at the position of an outer edge of each first plate 121 and are removed, so that a plurality of base portions 12 are completed. The first and second joining portions 923 and 924 are cut at the position of a boundary between each extension portion 324 and the corresponding second joining portion 924 in the second workpiece 922.

Regarding the above-described method for manufacturing the base portion 12, it may be understood that both end portions of each second joining portion 924 are left as the extension portions 324 at the outer edge portions of the corresponding second plates 122. The plurality of second plates 122 included in the second workpiece 922 can be easily positioned with respect to the plurality of first plates 121 included in the first workpiece 921 by arranging both end portions of each second joining portion 924 of the second workpiece 922 in the corresponding cut portions 315 of the first workpiece 921. As a result, manufacture of the base portions 12 of a plurality of vibration motors 1 can be simplified.

Referring to FIG. 2, the circuit board 13 is arranged on the base portion 12. A board central through hole, through which the base projecting portion 317 is inserted, is defined in a central portion of the circuit board 13. The board central through hole is, for example, circular in a plan view. The circuit board 13 is arranged to cover substantially an entire upper surface of the base portion 12 except for the projecting outer edge portion 314 of the base portion 12. In the preferred embodiment illustrated in FIG. 2, an outer edge of the circuit board 13 is arranged radially outward of a radially outer edge of the first plate recessed portion 313 and in contact with a radially inner surface of the projecting outer edge portion 314 above the first plate body 311. In an area of the upper surface of the base portion 12 which is covered with the circuit board 13, the upper surface of the first plate 121 and the upper surface of the second plate 122 are arranged at the same level as described above. The circuit board 13 is arranged to be in contact with both the upper surface of the first plate 121 and the upper surface of the second plate 122, and is supported by both the first and second plates 121 and 122. The circuit board is fixed to the base portion 12 through an adhesive, for example. The circuit board 13 is a flexible printed circuit (FPC) board, which has flexibility.

Figure 11:
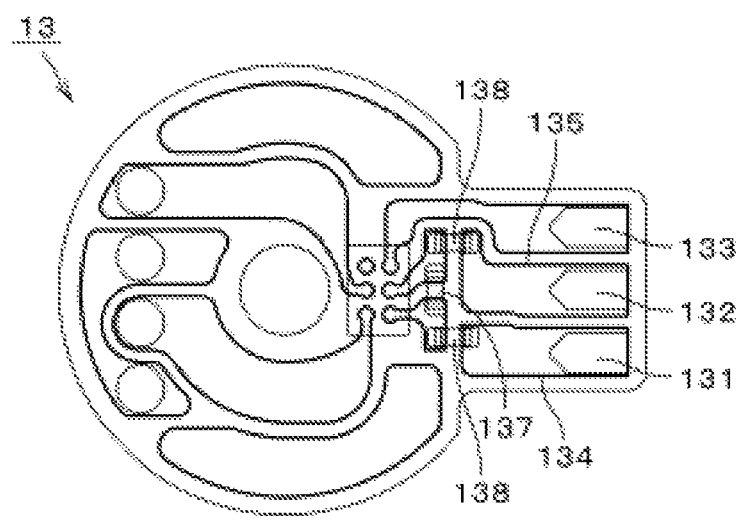
FIG. 11 is a plan view of a circuit board of the vibration motor.

FIG. 11 is a plan view illustrating the circuit board 13. In FIG. 11, for easier understanding of the figure, wiring patterns on the circuit board 13 are depicted in thick lines, while the contour of the circuit board 13 and electronic components, terminals, and so on on the circuit board 13 are depicted in thin lines. The circuit board 13 includes a first terminal 131, a second terminal 132, and a third terminal 133. The first terminal 131 is electrically connected to a power supply. The second terminal 132 is connected to a ground and is earthed. The third terminal 133 is connected to a control apparatus, which is not shown.

The first, second, and third terminals 131, 132, and 133 are arranged in a straight line on a portion of the circuit board 13 which lies on the first plate side portion 312. In the preferred embodiment illustrated in FIG. 11, the first, second, and third terminals 131, 132, and 133 are arranged in the order named from the bottom upward in the figure. Note that the order in which the first, second, and third terminals 131, 132, and 133 are arranged may be modified appropriately. In the case where the first, second, and third terminals 131, 132, and 133 are arranged in a straight line, the first and second terminals 131 and 132 are preferably arranged adjacent to each other. In other words, it is preferable that the middle one of the three terminals arranged in a straight line be the first terminal 131 or the second terminal 132.

A capacitor 137 is electrically connected to a first wiring pattern 134, which is a wiring pattern extending from the first terminal 131. The capacitor 137 is also electrically connected to a second wiring pattern 135, which is a wiring pattern extending from the second terminal 132. That is, the circuit board 13 includes the capacitor 137 electrically connected between the first and second terminals 131 and 132. Preferably, the circuit board 13 further includes a ferrite bead or beads 138 arranged on at least one of the first and second wiring patterns 134 and 135. In the preferred embodiment illustrated in FIG. 11, one ferrite bead 138 is arranged on the first wiring pattern 134, and another ferrite bead 138 is arranged on the second wiring pattern 135.

The coil portion 14 is attached onto the circuit board 13. In the preferred embodiment illustrated in FIGS. 5 and 6, the coil portion 14 includes two coils 141. The two coils 141 are arranged in one radial direction with the shaft 15 arranged therebetween. In other words, the two coils 141 are arranged at positions about 180 degrees away from each other in the circumferential direction. In a plan view, each coil 141 is annular and is arranged to surround an axis parallel to the shaft 15, with the shaft 15 being arranged outside of the coil 141. Each coil 141 is fixed onto the circuit board 13 through an adhesive, for example.

The coil portion 14 is electrically connected to the circuit board 13. Specifically, as illustrated in FIGS. 5 and 6, four lead wires 147 extending from the two coils 141 are each connected to a separate one of four connection terminals 139 on the circuit board 13. The four connection terminals 139 are arranged substantially in a straight line on the left side of the two coils 141 in FIG. 6. Therefore, two of the lead wires 147 are arranged to extend from each coil 141 to one side in a radial direction different from the aforementioned one radial direction in which the two coils 141 are arranged. For example, two of the lead wires 147 are arranged to extend from each coil 141 to one side in a radial direction perpendicular to the aforementioned one radial direction. Specifically, two of the lead wires 147 are arranged to extend from each coil 141 to an opposite side of the two coils 141 with respect to the first plate side portion 312 in a radial direction passing through a circumferential middle of the first plate side portion 312 and the central axis J1. Each lead wire 147 is connected to the circuit board 13 through, for example, soldering. Note that each lead wire 147 may alternatively be connected to the circuit board 13 by a method other than soldering.

The lower bearing portion 22 is tubular, and is centered on the central axis J1. The lower bearing portion 22 is, for example, substantially cylindrical, and is centered on the central axis J1. In this preferred embodiment, the lower bearing portion 22 is a plain bearing. Note that the lower bearing portion 22 may alternatively be a bearing of another type. The lower bearing portion 22 is made of, for example, a sintered metal. Preferably, the lower bearing portion 22 is impregnated with a lubricating oil. Note that the lower bearing portion 22 may alternatively be made of another material. The lower bearing portion 22 is fixed to the base portion 12. Specifically, the lower bearing portion 22 is arranged radially inside of the base projecting portion 317, and is fixed to the base projecting portion 317. The lower bearing portion 22 is fixed to the base projecting portion 317 through, for example, an adhesive.

The bearing housing portion 23 is in the shape of a covered tube, and is centered on the central axis J1. In other words, the bearing housing portion 23 includes a recessed portion that opens downwardly. The bearing housing portion 23 is, for example, substantially in the shape of a covered cylinder, and is centered on the central axis J1. The bearing housing portion 23 is defined by a member separate from both the base portion 12 and the cover portion 11. The bearing housing portion 23 is fixed to a central portion of the cover top portion 111, which is the top portion of the cover portion 11. For example, an upper end portion of the bearing housing portion 23 is press fitted from below into a through hole defined in the central portion of the top portion of the cover portion 11, so that the bearing housing portion 23 is fixed to the cover portion 11.

The upper bearing portion 21 is tubular, and is centered on the central axis J1. The upper bearing portion 21 is, for example, substantially cylindrical, and is centered on the central axis J1. The upper bearing portion 21 is a plain bearing. Note that the upper bearing portion 21 may alternatively be a bearing of another type. The upper bearing portion 21 is made of, for example, a sintered metal. Preferably, the upper bearing portion 21 is impregnated with a lubricating oil. Note that the upper bearing portion 21 may alternatively be made of another material. In the preferred embodiment illustrated in FIG. 2, the upper bearing portion 21 is arranged radially inside of the bearing housing portion 23, and is fixed to the bearing housing portion 23. The upper bearing portion 21 is thus indirectly fixed to the cover portion 11 through the bearing housing portion 23. The upper bearing portion 21 is fixed to the bearing housing portion 23 through, for example, an adhesive. The upper bearing portion 21 is supported by the bearing housing portion 23, so that an upper end portion of the tubular upper bearing portion 21 is closed. Note that the upper bearing portion 21 may alternatively be directly fixed to the cover portion 11.

The shaft 15 is a substantially columnar member centered on the central axis J1. The shaft 15 is arranged to extend along the central axis J1. The shaft 15 is made of, for example, a metal. Note that the shaft 15 may alternatively be made of another material. A lower end portion of the shaft 15 is arranged radially inside of the tubular lower bearing portion 22. An outside surface of the lower end portion of the shaft 15 is arranged radially opposite to an inside surface of the lower bearing portion 22. The lower end portion of the shaft 15 is rotatably supported by the lower bearing portion 22. In other words, the lower end portion of the shaft 15 is indirectly supported by the base portion 12 through the lower bearing portion 22.

An upper end portion of the shaft 15 is arranged radially inside of the tubular upper bearing portion 21. An outside surface of the upper end portion of the shaft 15 is arranged radially opposite to an inside surface of the upper bearing portion 21. The upper end portion of the shaft 15 is rotatably supported by the upper bearing portion 21. In other words, the upper end portion of the shaft 15 is indirectly supported by the cover portion 11 through the upper bearing portion 21 and the bearing housing portion 23. An upper end surface of the shaft 15 is arranged to be in vertical contact with a portion of the bearing housing portion 23 which closes the upper end portion of the upper bearing portion 21. The upper end surface of the shaft 15 is a convex surface which is convex upward.

The rotor holder 16 is a substantially annular member. The rotor holder 16 is arranged around the shaft 15. The rotor holder 16 is arranged to be capable of rotating about the central axis J1 together with the shaft 15. The rotor holder 16 includes an inner tubular portion 161, a holder body portion 162, and holder projecting portions 163. The inner tubular portion 161 is a substantially cylindrical portion centered on the central axis J1. The shaft 15 is arranged radially inside of the inner tubular portion 161. The inner tubular portion 161 is fixed to the shaft 15. The rotor holder 16 is thus attached to the shaft 15. An inside surface of the inner tubular portion 161 is arranged to be in contact with an outside surface of the shaft 15.

The holder body portion 162 is a portion substantially in the shape of an annular plate and arranged to extend radially outward from an upper end portion of the inner tubular portion 161. In other words, the holder body portion 162 is arranged to extend radially from the side of the shaft 15.

Each holder projecting portion 163 is arranged to project upward from an outer edge portion of the holder body portion 162. In the preferred embodiment illustrated in FIGS. 3 and 4, the rotor holder 16 includes two holder projecting portions 163. The rotor holder 16 is made of a metal. The rotor holder 16 is made of, for example, a non-magnetic material. The rotor holder 16 and the shaft 15 are fixed to each other by, for example, the shaft 15 being press fitted in the inner tubular portion 161.

In a central portion of the holder body portion 162, a recessed portion which is recessed downward relative to a portion of the holder body portion 162 which surrounds the central portion is defined. The spacer 24 is arranged in this recessed portion. The spacer 24 is substantially annular, and is centered on the central axis J1. The spacer 24 is fixed to the shaft 15. The spacer 24 and the shaft 15 are fixed to each other by, for example, the shaft 15 being press fitted in the spacer 24. A lower surface of the spacer 24 is arranged to be in contact with the holder body portion 162. An upper surface of the spacer 24 is arranged to be in contact with a lower end of the upper bearing portion 21 and a lower end of the bearing housing portion 23. The spacer 24 is arranged to radially overlap with the magnet portion 17 and the eccentric weight 18.

The magnet portion 17 is a substantially annular member centered on the central axis J1. The magnet portion 17 is attached to the rotor holder 16. In detail, an upper surface of the magnet portion 17, which is substantially cylindrical, is attached to a lower surface of the holder body portion 162 of the rotor holder 16. The magnet portion 17 is arranged above the two coils 141 of the coil portion 14, and is arranged vertically opposite to the coil portion 14 with a space therebetween.

The cover top portion 111 is arranged above the magnet portion 17. The vertical distance between the magnet portion 17 and the cover top portion 111 is arranged to be shorter than the vertical distance between the magnet portion 17 and the base portion 12. This makes an attractive force acting in the vertical direction between the magnet portion 17 and the cover top portion 111 greater than an attractive force acting in the vertical direction between the magnet portion 17 and the base portion 12. As a result, an upward force acts on the magnet portion 17 to keep the upper end surface of the shaft 15 in contact with the portion of the bearing housing portion 23 which closes the upper end portion of the upper bearing portion 21. Note that the vertical distance between the magnet portion 17 and the cover top portion 111 refers to, for example, the vertical distance between a vertical magnetic center of the magnet portion 17 and a lower surface of the cover top portion 111, which is arranged vertically above the magnet portion 17. Also note that the vertical distance between the magnet portion 17 and the base portion 12 refers to, for example, the vertical distance between the aforementioned magnetic center of the magnet portion 17 and an upper surface of the base portion 12, which is arranged vertically below the magnet portion 17.

The eccentric weight 18 is a member substantially in the shape of a semicircle and centered on the central axis J1. In the preferred embodiment illustrated in FIG. 3, the eccentric weight 18 is arranged to have a shape corresponding to that of a left half of a substantially cylindrical member. The eccentric weight 18 includes a weight upper portion 181 and a weight side portion 182. The weight upper portion 181 is a portion substantially in the shape of a semi-annular plate. The weight side portion 182 is a substantially semi-cylindrical portion arranged to extend downward from an outer edge portion of the weight upper portion 181. The eccentric weight 18 is attached to the rotor holder 16. A lower surface of the weight upper portion 181 is arranged to be in contact with an upper surface of the holder body portion 162 of the rotor holder 16. An inside surface of the weight side portion 182 is, for example, arranged radially opposite to a side surface of the holder body portion 162. A center of gravity of the eccentric weight 18 is radially away from the central axis J1. In the preferred embodiment illustrated in FIG. 2, the eccentric weight 18 is arranged to radially overlap with the upper bearing portion 21. In detail, the eccentric weight 18 is arranged to cover the entire vertical extent of the upper bearing portion 21 when viewed in a radial direction. The eccentric weight 18 is arranged to radially overlap with a lower portion of the bearing housing portion 23 as well.

In the preferred embodiment illustrated in FIG. 3, both circumferential end surfaces 183 of the eccentric weight 18 are arranged to be in contact with side surfaces of the two holder projecting portions 163. Each end surface 183 of the eccentric weight 18 is a portion of a side surface of the eccentric weight 18. That is, the side surface of the eccentric weight 18 is arranged to be in contact with the side surface of each holder projecting portion 163. An upper end of each holder projecting portion 163 is arranged at a level lower than that of at least a portion of an upper portion of the eccentric weight 18. Specifically, the upper end of the holder projecting portion 163 is arranged at a level lower than that of at least an upper portion of a portion of the eccentric weight 18 with which the holder projecting portion 163 is in contact. The eccentric weight 18 is fixed to the rotor holder 16 by, for example, the upper end of each holder projecting portion 163 being welded to the side surface of the eccentric weight 18. In this case, a welding mark is defined at a boundary between the upper end of the holder projecting portion 163 and the side surface of the eccentric weight 18.

In the vibration motor 1, an electric current is supplied to each coil 141 of the coil portion 14 through the circuit board 13 to generate a torque between the coil 141 and the magnet portion 17. The rotating portion, that is, a combination of the shaft 15, the rotor holder 16, the magnet portion 17, the eccentric weight 18, and the spacer 24, is thus caused to rotate about the central axis J1. Since the center of gravity of the eccentric weight 18 is radially away from the central axis J1 as described above, the rotation of the eccentric weight 18 causes vibrations. If the supply of the electric current to the coil portion 14 is stopped, the rotation of the rotating portion stops. When the rotation of the rotating portion stops, a plurality of magnetic poles of the magnet portion 17 stop at predetermined circumferential stop positions.

Figure 12:
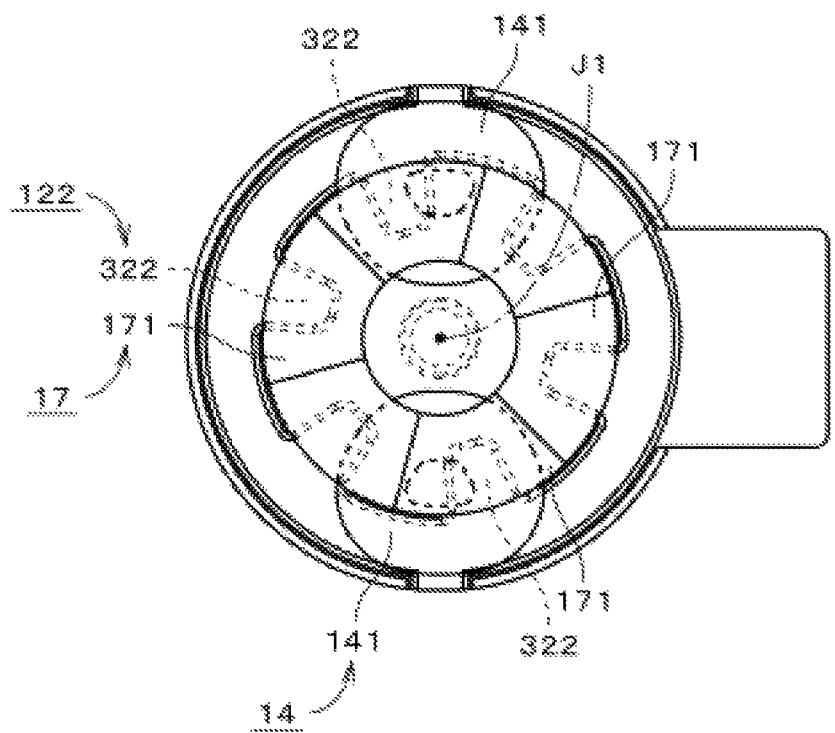
FIG. 12 is a plan view of a magnet portion, a coil portion, and the base portion of the vibration motor.

FIG. 12 is a diagram illustrating an example stop position of the magnet portion 17. FIG. 12 is a plan view illustrating the magnet portion 17, the coil portion 14, and the base portion 12. In FIG. 12, for easier understanding of the positional relationships between the magnet portion 17, the coil portion 14, and the second plate projecting portions 322 of the base portion 12, the circuit board 13 and so on are not shown.

The magnet portion 17 includes a plurality of magnetic poles 171. The number of magnetic poles 171 is, for example, a multiple of two. In the preferred embodiment illustrated in FIG. 12, the magnet portion 17 includes six magnetic poles 171. That is, the magnet portion 17 includes three north poles and three south poles. The three north poles and the three south poles are arranged to alternate with each other in the circumferential direction. The magnetic poles 171 are arranged at equal angular intervals in the circumferential direction. In the preferred embodiment illustrated in FIG. 12, the six magnetic poles 171 are arranged at intervals of about 60 degrees. In other words, in a plan view, an angle defined between a straight line that joins a circumferential middle of each magnetic pole 171 and the central axis J1, and a straight line that joins a circumferential middle of the magnetic pole 171 adjacent thereto and the central axis J1, is about 60 degrees. Note that the number of magnetic poles 171 may be modified appropriately.

The number of second plate projecting portions 322 of the base portion 12 is preferably equal to or smaller than the number of magnetic poles 171. In the preferred embodiment illustrated in FIG. 12, the number of second plate projecting portions 322 is equal to the number of magnetic poles 171. As described above, the second plate projecting portions 322 are arranged at equal angular intervals in the circumferential direction, and the magnetic poles 171 are also arranged at equal angular intervals in the circumferential direction. Therefore, in the preferred embodiment illustrated in FIG. 12, both the second plate projecting portions 322 and the magnetic poles 171 are arranged at the same angular intervals of about 60 degrees in the circumferential direction.

Each of the second plate projecting portions 322 is arranged vertically opposite to the magnet portion 17. The circumferential width of a portion of each second plate projecting portion 322 which is opposed to the magnet portion 17 in the vertical direction is equal to or smaller than the circumferential width of each magnetic pole 171 of the magnet portion 17 at any radial position. In the preferred embodiment illustrated in FIG. 12, the circumferential width of the portion of each second plate projecting portion 322 which is opposed to the magnet portion 17 in the vertical direction is smaller than the circumferential width of each magnetic pole 171 of the magnet portion 17 at any radial position.

In the vibration motor 1, once the supply of the electric current to each coil 141 of the coil portion 14 is stopped, cogging torque generated between the second plate projecting portions 322, each of which is made of the magnetic metal, and the magnet portion 17 causes the rotating portion to stop with each of the magnetic poles 171 of the magnet portion 17 positioned over one of the second plate projecting portions 322. In detail, the rotating portion is caused to stop with the circumferential middle of each magnetic pole 171 positioned opposite to the circumferential middle of one of the second plate projecting portions 322 in the vertical direction. In the preferred embodiment illustrated in FIG. 12, the circumferential middle of each of the six magnetic poles 171 coincides with the circumferential middle of a separate one of the six second plate projecting portions 322 when viewed in the vertical direction.

In the vibration motor 1, the positional relationships between the second plate 122 and the coils 141 are set such that the circumferential middle of each second plate projecting portion 322 does not coincide with the circumferential middle of any coil 141 when viewed in the vertical direction. In the preferred embodiment illustrated in FIG. 12, the second plate projecting portion 322 that is the closest to each coil 141 in the circumferential direction is displaced in a counterclockwise direction from the circumferential middle of the coil 141 by about 15 degrees. Because the circumferential middle of each second plate projecting portion 322 is displaced in the circumferential direction from the circumferential middle of each coil 141 as described above, the circumferential middle of each magnetic pole 171 is displaced in the circumferential direction from the circumferential middle of each coil 141 when the rotating portion is in a stopped state. Each magnetic pole 171 is thus prevented from being positioned at any dead point, which would prohibit the rotating portion from starting rotating, when the rotating portion is in the stopped state. An angle made by the circumferential middle of each coil 141, the central axis J1, and the circumferential middle of the second plate projecting portion 322 that is the closest to the coil 141 is preferably 90 degrees divided by the number of magnetic poles 171.

In the vibration motor 1, the circumferential width of each second plate projecting portion 322 may be varied to adjust the magnitude of the aforementioned cogging torque. Specifically, the cogging torque increases as the circumferential width of the second plate projecting portion 322 increases, while the cogging torque decreases as the circumferential width of the second plate projecting portion 322 decreases. Moreover, the thickness of each second plate projecting portion 322 may be increased or decreased to increase or decrease the cogging torque.

As described above, the vibration motor 1 includes the cover portion 11, the base portion 12, the circuit board 13, the coil portion 14, the shaft 15, the rotor holder 16, the magnet portion 17, and the eccentric weight 18. The base portion 12 is arranged to extend perpendicularly to the central axis J1, which extends in the vertical direction. The cover portion 11 is arranged above the base portion 12, and is fixed to the outer edge portion of the base portion 12. The shaft 15 is arranged to extend along the central axis J1. The lower end portion and the upper end portion of the shaft 15 are supported by the base portion 12 and the cover portion 11, respectively. The rotor holder 16 is arranged around the shaft 15 to be rotatable about the central axis J1. The magnet portion 17 includes the plurality of magnetic poles 171, and is attached to the rotor holder 16. The eccentric weight 18 is attached to the rotor holder 16. The circuit board 13 is arranged on the base portion 12. The coil portion 14 is attached onto the circuit board 13, and is arranged vertically opposite to the magnet portion 17 with the space therebetween.

The base portion 12 includes the first and second plates 121 and 122. The first plate 121 includes the first plate recessed portion 313 in the upper surface thereof. The second plate 122 is arranged in the first plate recessed portion 313, and is fixed to the first plate 121. Fixing the second plate 122 in the first plate recessed portion 313 as described above facilitates the manufacture of the base portion 12. In addition, the rigidity of the base portion 12 is increased by overlapping of the first and second plates 121 and 122 at the position where the first plate recessed portion 313 is defined. Further, the second plate 122 having the same shape and size as those of the first plate recessed portion 313 makes it easier to arrange the second plate 122 in the first plate recessed portion 313, and leads to an additional increase in the rigidity of the base portion 12.

In the vibration motor 1, the upper surface of the second plate 122 is arranged at the same level as that of the portion of the upper surface of the first plate 121 which lies adjacent to and along the first plate recessed portion 313. As a result, a lower surface of the circuit board 13 makes contact with both the upper surface of the first plate 121 and the upper surface of the second plate 122. This leads to an increase in the area of contact between the circuit board 13 and the base portion 12, and an improvement in strength with which the circuit board 13 is fixed to the base portion 12. Note that the upper surface of the second plate 122 and the portion of the upper surface of the first plate 121 which lies adjacent to and along the first plate recessed portion 313 may be only substantially arranged at the same level. In other words, the level of the upper surface of the second plate 122 and the level of the portion of the upper surface of the first plate 121 which lies adjacent to and along the first plate recessed portion 313 may be either exactly the same or slightly different as long as the difference is so small that the two levels can be regarded as substantially the same. Either of these cases leads to an improvement in the strength with which the circuit board 13 is fixed to the base portion 12 in the vibration motor 1, as described above.

In the base portion 12, one of the first and second plates 121 and 122 is made of a magnetic metal, and the other one of the first and second plates 121 and 122 is made of a nonmagnetic metal. The second plate 122 includes the second plate support portion 321 and the plurality of second plate projecting portions 322. The second plate support portion 321 is annular, and is centered on the central axis J1. The second plate projecting portions 322 are arranged to project radially inward from the second plate support portion 321, and are arranged in the circumferential direction at the position vertically opposed to the magnet portion 17. This contributes to preventing each magnetic pole 171 of the magnet portion 17 from being positioned at any dead point when the rotating portion is in the stopped state as described above. In addition, because the second plate projecting portions 322 are joined to one another through the second plate support portion 321, the second plate 122 can be handled with ease, and the manufacture of the base portion 12 can be simplified.

In the preferred embodiment described above, the first plate 121 is made of a nonmagnetic metal, while the second plate 122 is made of a magnetic metal. Accordingly, no magnetic metal is present in the base portion 12 except where the second plate 122 exists. As a result, in an area vertically opposed to the magnet portion 17, portions of the base portion 12 where the magnetic metal exists and portions of the base portion 12 where no magnetic metal exists alternate with each other in the circumferential direction. This makes it still easier to prevent each magnetic pole 171 of the magnet portion 17 from being positioned at any dead point when the rotating portion is in the stopped state.

The second plate projecting portions 322 may not necessarily be arranged to project radially inward from the second plate support portion 321, but may alternatively be arranged to project radially outward from the second plate support portion 321. For example, the second plate 122 may alternatively include a second plate support portion 321 having an outside diameter smaller than that of the second plate support portion 321 according to the above-described preferred embodiment, and a plurality of second plate projecting portions 322 arranged to project radially outward from the second plate support portion 321. That is, the second plate projecting portions 322 are arranged to project radially inward or radially outward from the second plate support portion 321. In either case, in the vibration motor 1, each magnetic pole 171 of the magnet portion 17 can be prevented from being positioned at any dead point when the rotating portion is in the stopped state as described above.

In the preferred embodiment described above, the second plate projecting portions 322 are arranged to project radially inward from the second plate support portion 321 in the second plate 122. Thus, the second plate 122 can have a greater area than in the case where the second plate support portion 321 is arranged inside of the second plate projecting portions 322. This leads to a further increase in the rigidity of the base portion 12.

In the vibration motor 1, the second plate 122 includes the through holes 323, each of which is arranged radially outward of the magnet portion 17. The first plate 121 includes the projection portions 316, each of which is arranged to project upward from a bottom surface of the first plate recessed portion 313, and is fitted into the corresponding through hole 323. This makes it easier to position the second plate 122 with respect to the first plate 121 when the second plate 122 is arranged in the first plate recessed portion 313. In addition, because each through hole 323 is not arranged under the magnet portion 17, the through hole 323 is prevented from acting to reduce the aforementioned cogging torque.

The first plate 121 includes the projecting outer edge portion 314 arranged to project upward in the outer edge portion thereof. This leads to an increase in the area of contact between the inside surface of the lower end portion of the cover portion 11 and the outside surface of the base portion 12. This in turn leads to an increase in strength with which the cover portion 11 is fixed to the base portion 12. In addition, the outer edge of the circuit board 13 is arranged radially outward of the radially outer edge of the first plate recessed portion 313 and in contact with the radially inner surface of the projecting outer edge portion 314. This makes it easy to position the circuit board 13 with respect to the base portion 12 when the circuit board 13 is attached to the base portion 12.

The projecting outer edge portion 314 is arranged to extend along the outer edge of the first plate 121. The cut portions 315 are defined in the projecting outer edge portion 314, and a portion of the outer edge portion of the second plate 122 is arranged in each cut portion 315. This makes it easier to position the second plate 122 with respect to the first plate 121.

As described above, the first plate 121 includes the first plate body 311 and the first plate side portion 312. The first plate body 311 is arranged under the cover portion 11. The first plate side portion 312 is arranged to extend from the first plate body 311 substantially perpendicularly to the central axis J1 to project radially outward from the cover portion 11. The upper surface of the first plate side portion 312 and the upper surface of the second plate 122 are arranged at the same level. As a result, a lower surface of a portion of the circuit board 13 which projects radially outward from the cover portion 11 is arranged to be in contact with the upper surface of the first plate side portion 312. This leads to a further improvement in the strength with which the circuit board 13 is fixed to the base portion 12.

Note that the upper surface of the first plate side portion 312 and the upper surface of the second plate 122 may be only substantially arranged at the same level. In other words, the level of the upper surface of the first plate side portion 312 and the level of the upper surface of the second plate 122 may be either exactly the same or slightly different as long as the difference is so small that the two levels can be regarded as substantially the same. Either of these cases leads to a further improvement in the strength with which the circuit board 13 is fixed to the base portion 12 in the vibration motor 1, as described above.

In the vibration motor 1, the coil portion 14 includes the two coils 141 arranged in one radial direction with the shaft 15 arranged therebetween. Two of the lead wires 147 are arranged to extend from each coil 141 to one side in a radial direction different from the aforementioned one radial direction. This enables the connection terminals 139 for the two coils 141 to be arranged, on the circuit board 13, on one side of the straight line on which the two coils 141 are arranged. This makes it easy to connect the circuit board 13 with the coil portion 14.

As described above, the circuit board 13 includes the first, second, and third terminals 131, 132, and 133 and the capacitor 137. The first terminal 131 is electrically connected to the power supply. The second terminal 132 is earthed. The third terminal 133 is connected to the control apparatus. The first, second, and third terminals 131, 132, and 133 are arranged in a straight line. The capacitor 137 is electrically connected between the first and second terminals 131 and 132. This contributes to eliminating electrical noise of the vibration motor 1. In addition, the first and second terminals 131 and 132 are arranged adjacent to each other. This facilitates the arrangement of the capacitor 137 and the aforementioned electrical connection of the capacitor 137.

The circuit board 13 further includes the ferrite bead or beads 138 arranged on at least one of the first and second wiring patterns 134 and 135. Thus, high frequency noise can be eliminated from electric currents flowing in the first and second wiring patterns 134 and 135. This eliminates or reduces the likelihood that high frequency noise will cause a decrease in performance of an antenna of the mobile communication apparatus or the like, for example, even in the case where the vibration motor 1 is arranged in the vicinity of the antenna.

Figure 13:
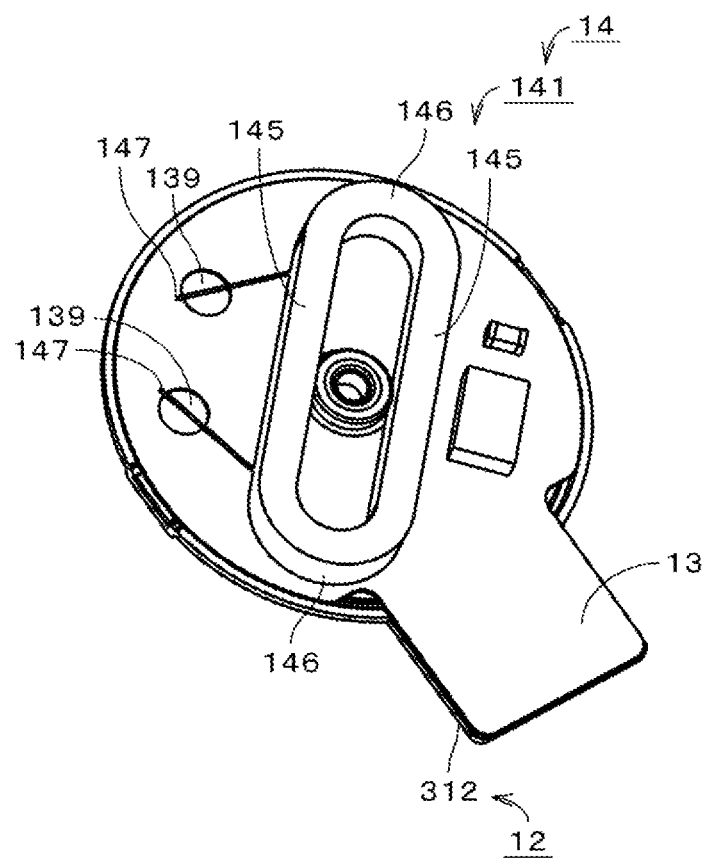
FIG. 13 is a perspective view of a stationary portion of a vibration motor according to another preferred embodiment of the present invention.

Note that the number of coils 141 included in the coil portion 14 of the vibration motor 1 is not limited to two, but may alternatively be one or more than two. A vibration motor 1 according to another preferred embodiment of the present invention, in which a coil portion 14 includes only one coil 141, will now be described below. FIG. 13 is a perspective view of a stationary portion of this vibration motor 1.

In the preferred embodiment illustrated in FIG. 13, the coil portion 14 is defined by a single annular coil 141. The coil 141 is attached onto a circuit board 13, and is electrically connected to the circuit board 13. The coil 141 is fixed onto the circuit board 13 through, for example, an adhesive. A shaft 15 (not shown) is arranged inside of the coil 141.

The coil 141 is, for example, substantially in the shape of an oblong ring, elongated in one radial direction in a plan view. The coil 141 includes two long side portions 145 and two short side portions 146. Each of the two long side portions 145 is arranged to extend in the aforementioned one radial direction, which is a longitudinal direction of the coil 141, with the shaft 15 arranged between the two long side portions 145. The two short side portions 146 are portions in the shape of a semicircle and arranged to join both end portions of the two long side portions 145. Each of the two short side portions 146, which are radially outer end portions of the coil 141, is arranged above a second plate support portion 321 (not shown) of a base portion 12, and is arranged to overlap with the second plate support portion 321 when viewed in the vertical direction. In addition, each short side portion 146 is arranged radially outward of an outer circumferential edge of a magnet portion 17 (not shown). Note that each short side portion 146 may alternatively be arranged radially inward of the outer circumferential edge of the magnet portion 17 (not shown).

Each of two lead wires 147 extending from the one coil 141 is connected to a separate one of two connection terminals 139 on the circuit board 13. The two connection terminals 139 are arranged on the left side of the coil 141 in the figure. Therefore, each of the two lead wires 147 extends from the coil 141 to an opposite side of the coil 141 with respect to a first plate side portion 312. Because the two lead wires 147 are arranged to extend from the coil 141 to one side in a radial direction different from the aforementioned radial direction, which is the longitudinal direction of the coil 141, as described above, the circuit board 13 and the coil portion 14 can be easily connected to each other. For example, the two lead wires 147 are arranged to extend from the coil 141 to one side in a radial direction perpendicular to the aforementioned one radial direction. Each lead wire 147 is connected to the circuit board 13 through, for example, soldering. Note that each lead wire 147 may alternatively be connected to the circuit board 13 by a method other than soldering.

Figure 14:
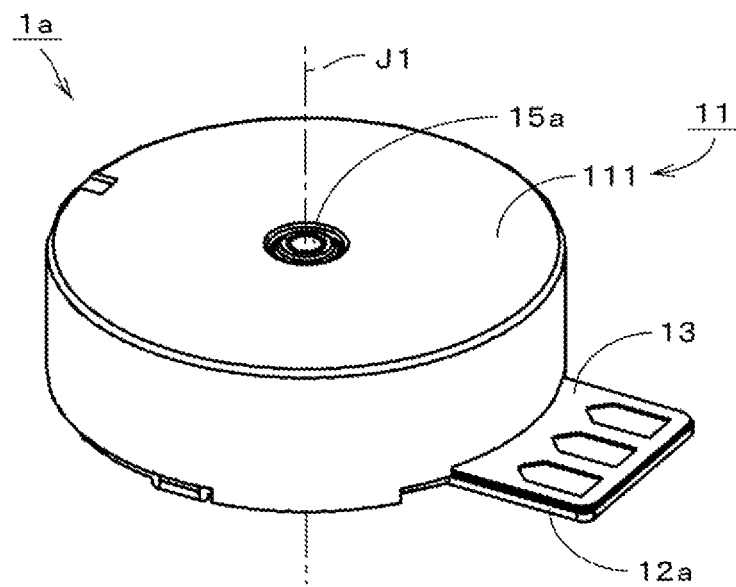
FIG. 14 is a perspective view of a vibration motor according to a second preferred embodiment of the present invention.
Figure 15:
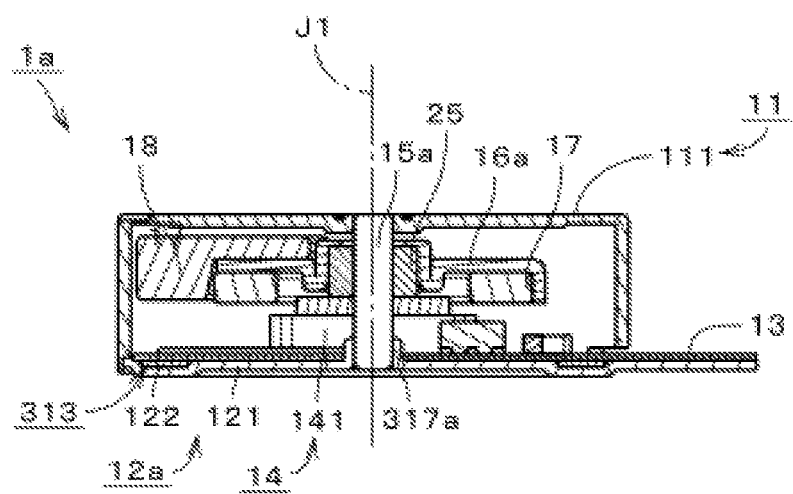
FIG. 15 is a vertical sectional view of the vibration motor according to the second preferred embodiment of the present invention.
Figure 16:
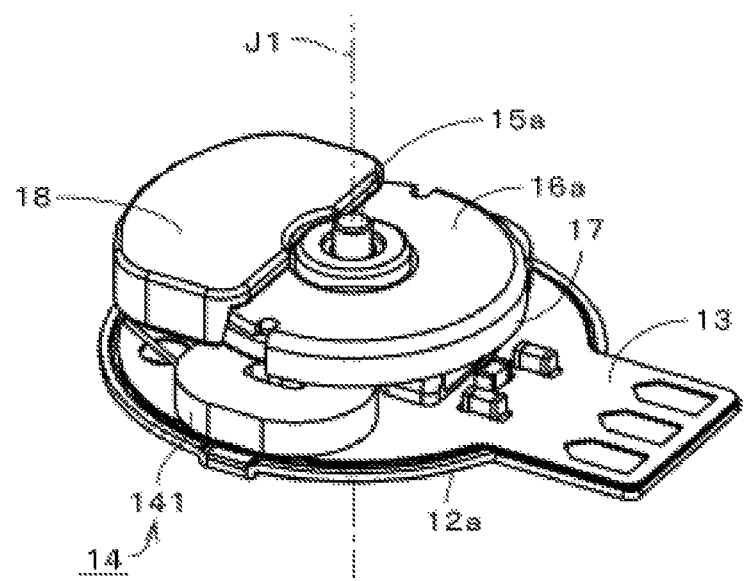
FIG. 16 is a perspective view of a rotating portion and a stationary portion of the vibration motor according to the second preferred embodiment of the present invention.
Figure 17:
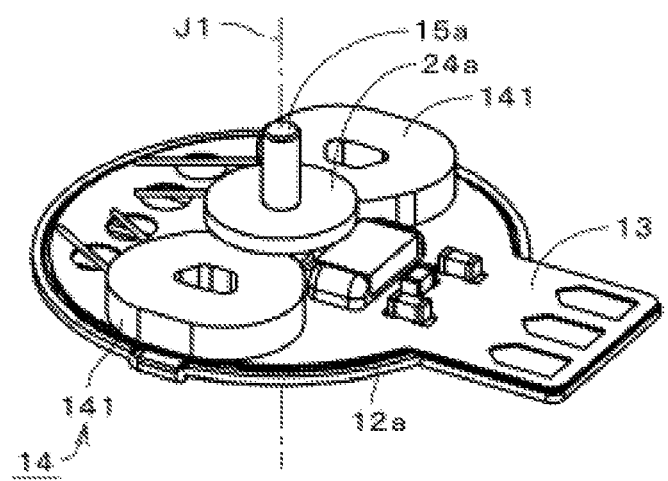
FIG. 17 is a perspective view of the stationary portion according to the second preferred embodiment of the present invention.
Figure 18:
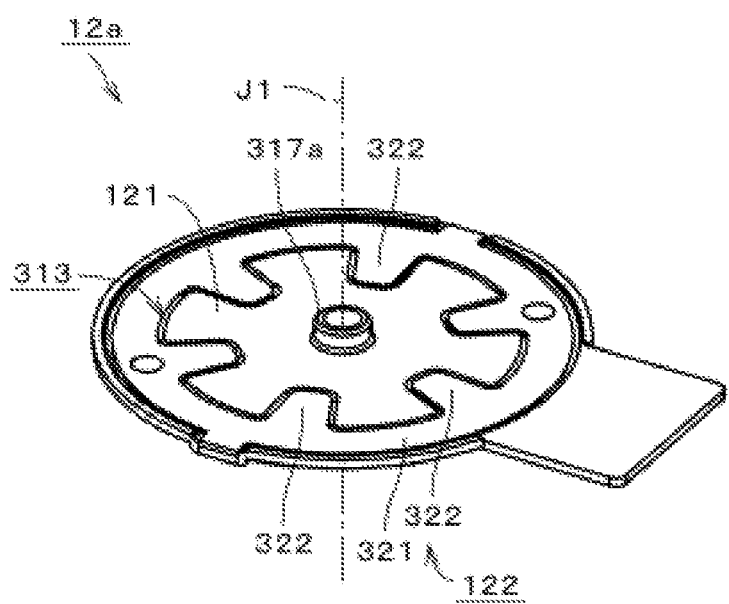
FIG. 18 is a perspective view of a base portion of the vibration motor according to the second preferred embodiment of the present invention.

FIG. 14 is a perspective view illustrating the external appearance of a vibration motor 1a according to a second preferred embodiment of the present invention. FIG. 15 is a vertical sectional view of the vibration motor 1a. Parallel oblique lines are omitted for sections of details in FIG. 15. In addition, in FIG. 15, features on the far side of the section of the vibration motor 1a are also depicted. FIG. 16 is a perspective view of a rotating portion and a stationary portion of the vibration motor 1a. FIG. 17 is a perspective view of the stationary portion of the vibration motor 1a. FIG. 18 is a perspective view of a base portion 12a.

The vibration motor 1a is a vibration motor of a fixed-shaft type. The vibration motor 1a includes the base portion 12a, a shaft 15a, a rotor holder 16a, a spacer 24a, and a bearing portion 25 in place of the base portion 12, the shaft 15, the rotor holder 16, the spacer 24, and the upper and lower bearing portions 21 and 22 described above. In addition, the vibration motor 1a does not include the above-described bearing housing portion 23. The vibration motor 1a is otherwise substantially similar in structure to the above-described vibration motor 1, and accordingly, like members or portions are designated by like reference numerals in the following description.

The base portion 12a is substantially similar in structure to the above-described base portion 12 except that the base portion 12a includes a base projecting portion 317a having an inside diameter smaller than that of the base projecting portion 317 in place of the base projecting portion 317 illustrated in FIG. 7.

Similarly to the above-described shaft 15, the shaft 15a is a substantially columnar member arranged to extend along a central axis J1. A lower end portion of the shaft 15a is arranged inside of the base projecting portion 317a, and is fixed to the base portion 12a. The lower end portion of the shaft 15a is, for example, press fitted in the base projecting portion 317a, and is welded to a first plate 121 of the base portion 12a. The shaft 15a is arranged to project upward from the base portion 12a along the central axis J1. An upper end portion of the shaft 15a is fixed to a cover top portion 111 of a cover portion 11. The shaft 15a is, for example, press fitted in a through hole defined in the cover top portion 111, and is welded to the cover top portion 111. The shaft 15a is made of, for example, a metal. Note that the shaft 15a may alternatively be made of another material.

The spacer 24a is a substantially annular, plate-shaped member including a through hole defined in a center thereof. In the preferred embodiment illustrated in FIG. 17, the spacer 24a is in the shape of a circular ring, and is centered on the central axis J1. Note that the spacer 24a may alternatively be, for example, in the shape of the letter "C", that is, a circular ring with one circumferential portion omitted. The shaft 15a is inserted through the through hole of the spacer 24a. The spacer 24a is attached to the shaft 15a through, for example, press fitting. The spacer 24a is arranged above a coil portion 14, and is fixed to the shaft 15a. The spacer 24a is made of, for example, a resin. Note that the spacer 24a may alternatively be made of another material. Also note that the spacer 24a may alternatively be attached to the shaft 15a by a method other than press fitting. A lower surface of the spacer 24a is arranged opposite to upper surfaces of coils 141 of the coil portion 14 in the vertical direction. In the preferred embodiment illustrated in FIG. 15, the lower surface of the spacer 24a is arranged to be in contact with the upper surfaces of the coils 141 of the coil portion 14.

The bearing portion 25 is an annular member including a through hole defined in a center thereof. In the preferred embodiment illustrated in FIG. 15, the bearing portion 25 is a substantially cylindrical member centered on the central axis J1. The shaft 15a is inserted through the through hole of the bearing portion 25. The bearing portion 25 is attached to the shaft 15a to be rotatable with respect to the shaft 15a above the coils 141 of the coil portion 14. The bearing portion 25 is a plain bearing. Note that the bearing portion 25 may alternatively be a bearing of another type. The bearing portion 25 is made of, for example, a sintered metal. Preferably, the bearing portion 25 is impregnated with a lubricating oil. Note that the bearing portion 25 may alternatively be made of another material.

The bearing portion 25 is arranged above the spacer 24a. In other words, the spacer 24a is attached to the shaft 15a between the bearing portion 25 and the coils 141 of the coil portion 14. An upper surface of the spacer 24a is arranged to be in contact with a lower surface of the bearing portion 25.

The rotor holder 16a is a substantially disk-shaped member. The rotor holder 16a is attached to the bearing portion 25. In detail, an inner circumferential portion of a central portion of the rotor holder 16a is fixed to, for example, an outer circumferential surface of the bearing portion 25. The rotor holder 16a is thus supported by the bearing portion 25 to be rotatable with respect to the shaft 15a. The rotor holder 16a is made of, for example, a metal.

In the vibration motor 1a, an electric current is supplied to each coil 141 of the coil portion 14 through a circuit board 13 to generate a torque between the coil 141 and a magnet portion 17. The rotating portion, that is, a combination of the bearing portion 25, the rotor holder 16a, the magnet portion 17, and an eccentric weight 18, is thus caused to rotate about the central axis J1. Since a center of gravity of the eccentric weight 18 is radially away from the central axis J1, the rotation of the eccentric weight 18 causes vibrations. If the supply of the electric current to the coil portion 14 is stopped, the rotation of the rotating portion stops. When the rotation of the rotating portion stops, a plurality of magnetic poles of the magnet portion 17 stop at predetermined circumferential stop positions, as described above.

In the vibration motor 1a, as in the above-described vibration motor 1, the base portion 12a includes the first plate 121 and a second plate 122. The first plate 121 includes a first plate recessed portion 313 in an upper surface thereof. The second plate 122 is arranged in the first plate recessed portion 313, and is fixed to the first plate 121. Thus, the base portion 12a can be easily manufactured, and an increase in rigidity of the base portion 12a can be achieved, as is similarly the case with the base portion 12 of the vibration motor 1. In addition, the second plate 122 is arranged to have the same shape and size as those of the first plate recessed portion 313, and this makes it easy to arrange the second plate 122 in the first plate recessed portion 313, and leads to an additional increase in the rigidity of the base portion 12a.

In the vibration motor 1a, as in the vibration motor 1, an upper surface of the second plate 122 is arranged at the same level as that of a portion of the upper surface of the first plate 121 which lies adjacent to and along the first plate recessed portion 313. This leads to an improvement in strength with which the circuit board 13 is fixed to the base portion 12a.

In the base portion 12a, as in the above-described base portion 12, one of the first and second plates 121 and 122 is made of a magnetic metal, and the other one of the first and second plates 121 and 122 is made of a nonmagnetic metal. The second plate 122 includes a second plate support portion 321 and a plurality of second plate projecting portions 322. The second plate support portion 321 is annular, and is centered on the central axis J1. The second plate projecting portions 322 are arranged to project radially inward from the second plate support portion 321, and are arranged in the circumferential direction at a position vertically opposed to the magnet portion 17. Thus, as in the above-described vibration motor 1, each magnetic pole of the magnet portion 17 can be prevented from being positioned at any dead point when the rotating portion is in the stopped state.

Note that each of the above-described vibration motors 1 and 1a may be modified in various manners.

In each of the base portions 12 and 12a, the second plate 122 may not necessarily be arranged to have substantially the same shape and size as those of the first plate recessed portion 313 as long as the second plate 122 can be arranged in the first plate recessed portion 313.

In the vibration motor 1, the bearing housing portion and the cover portion 11 may alternatively be defined by a single continuous monolithic member. In the vibration motor 1, the bearing housing portion 23 may not necessarily be arranged to support the upper bearing portion 21, but may alternatively be, for example, fixed to the base portion 12 to support the lower bearing portion 22. That is, the vibration motor 1 includes the bearing housing portion 23 arranged to support one of the upper and lower bearing portions 21 and 22. In addition, the bearing housing portion 23 is arranged to close one vertical end portion of the above one of the upper and lower bearing portions 21 and 22, and to be in vertical contact with the corresponding end surface of the shaft 15. Also, in the vibration motor 1, the bearing housing portion 23, which is arranged to support the upper bearing portion 21, and another bearing housing portion 23, which is arranged to support the lower bearing portion 22, may alternatively be fixed to the cover portion 11 and the base portion 12, respectively.

In each of the vibration motors 1 and 1a, the lower and upper end portions of the shaft 15 or 15a may not necessarily be supported by the base portion 12 or 12a and the cover portion 11, respectively, but it may be sufficient if at least one of the base portion 12 or 12a and the cover portion 11 is arranged to support an end portion of the shaft 15 or 15a. Even in this case, since each of the base portions 12 and 12a includes the first plate 121, which includes the first plate recessed portion 313 in the upper surface thereof, and the second plate 122, which is arranged in the first plate recessed portion 313 and is fixed to the first plate 121, each of the base portions 12 and 12a can be manufactured easily, and an increase in the rigidity of each of the base portions 12 and 12a can be achieved. In the vibration motor 1, the upper end portion of the shaft 15 may not be supported by the cover portion 11, with the lower end portion of the shaft 15 being rotatably supported by the base portion 12 through the lower bearing portion 22, for example.

The vertical distance between the magnet portion 17 and the cover top portion 111 may alternatively be equal to or greater than the vertical distance between the magnet portion 17 and the base portion 12 or 12a.

The cover portion 11, the rotor holder 16, and other members may be made of various materials.

Attachment and fixing of the members of each of the vibration motors 1 and 1*a* may be achieved indirectly. For example, the coil portion 14 may be attached to the circuit board 13 with another member intervening therebetween. Each of the attachment of the magnet portion 17 to the rotor holder 16 or 16*a*, the attachment of the eccentric weight 18 to the rotor holder 16 or 16*a*, the fixing of the cover portion 11 to the base portion 12 or 12*a*, and so on may also be achieved with an intervention of another member.

Features of the above-described preferred embodiments and the modifications thereof may be combined appropriately as long as no conflict arises.

Vibration motors according to preferred embodiments of the present invention may be used for various purposes. Vibration motors according to preferred embodiments of the present invention are preferably used as, for example, silent notification devices in mobile communication apparatuses, such as cellular phones.

Features of the above-described preferred embodiments and the modifications thereof may be combined appropriately as long as no conflict arises. While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vibration motor comprising:
   a base portion arranged to extend perpendicularly to a central axis extending in a vertical direction;
   a cover portion arranged above the base portion, and fixed to an outer edge portion of the base portion;
   a shaft arranged to extend along the central axis, and having an end portion or portions supported by at least one of the base portion and the cover portion;
   a rotor holder arranged around the shaft to be rotatable about the central axis;
   a magnet portion including a plurality of magnetic poles, and attached to the rotor holder;
   an eccentric weight attached to the rotor holder;
   a circuit board arranged above the base portion; and
   a coil portion attached onto the circuit board, and arranged vertically opposite to the magnet portion with a space therebetween; wherein
   the base portion includes:
   a first plate including a first plate recessed portion in an upper surface thereof; and
   a second plate arranged in the first plate recessed portion, and fixed to the first plate;
   one of the first and second plates is made of a magnetic metal, while another one of the first and second plates is made of a nonmagnetic metal;
   an upper surface of the second plate is arranged at a same level as that of a portion of the upper surface of the first plate which lies adjacent to and along the first plate recessed portion; and
   the second plate includes:
   an annular second plate support portion centered on the central axis; and
   a plurality of second plate projecting portions arranged to project radially inward from the second plate support portion, and arranged in a circumferential direction at a position vertically opposed to the magnet portion.

2. The vibration motor according to claim 1, wherein the first plate is made of the nonmagnetic metal, while the second plate is made of the magnetic metal.

3. The vibration motor according to claim 1, wherein
   the second plate includes a through hole arranged radially outward of the magnet portion; and
   the first plate includes a projection portion arranged to project upward from a bottom surface of the first plate recessed portion, and fitted into the through hole.

4. The vibration motor according to claim 1, wherein the first plate includes a projecting outer edge portion arranged to project upward in an outer edge portion thereof.

5. The vibration motor according to claim 4, wherein an outer edge of the circuit board is arranged radially outward of a radially outer edge of the first plate recessed portion and in contact with a radially inner surface of the projecting outer edge portion.

6. The vibration motor according to claim 4, wherein
   the projecting outer edge portion is arranged to extend along an outer edge of the first plate;
   the projecting outer edge portion includes a cut portion defined therein; and
   a portion of an outer edge portion of the second plate is arranged in the cut portion.

7. The vibration motor according to claim 1, wherein
   the first plate includes:
   a first plate body arranged under the cover portion; and
   a first plate side portion arranged to extend from the first plate body perpendicularly to the central axis to project radially outward from the cover portion; and
   the upper surface of the second plate and an upper surface of the first plate side portion are arranged at a same level.

8. The vibration motor according to claim 1, wherein
   the coil portion includes two coils arranged in one radial direction with the shaft arranged therebetween; and
   two lead wires are arranged to extend from each coil to one side in a radial direction different from the one radial direction.

9. The vibration motor according to claim 1, wherein
   the coil portion is defined by a single annular coil elongated in one radial direction with the shaft arranged inside of the coil; and
   two lead wires are arranged to extend from the coil to one side in a radial direction different from the one radial direction.

10. The vibration motor according to claim 1, wherein
    the circuit board includes:
    a first terminal electrically connected to a power supply;
    a second terminal to be earthed;
    a third terminal connected to a control apparatus; and
    a capacitor electrically connected between the first and second terminals;
    the first, second, and third terminals are arranged in a straight line; and
    the first and second terminals are arranged adjacent to each other.

11. The vibration motor according to claim 10, wherein the circuit board further includes a ferrite bead or beads arranged on at least one of a wiring pattern extending from the first terminal and a wiring pattern extending from the second terminal.

* * * * *